(12) United States Patent
Goodwin et al.

(10) Patent No.: US 7,219,098 B2
(45) Date of Patent: May 15, 2007

(54) SYSTEM AND METHOD FOR PROCESSING DATA IN A DISTRIBUTED ARCHITECTURE

(75) Inventors: James Patrick Goodwin, Beverly, MA (US); David LeRoy Newbold, West Roxbury, MA (US); Andrew Lewis Schirmer, Andover, MA (US); Jeff Reagen, Mendon, MA (US); John Banks-Binici, Westborough, MA (US); John Douglas Curtis, Millbury, MA (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 10/045,064

(22) Filed: Jan. 15, 2002

(65) Prior Publication Data

US 2003/0135489 A1    Jul. 17, 2003

Related U.S. Application Data

(60) Provisional application No. 60/347,283, filed on Jan. 14, 2002.

(51) Int. Cl.
*G06F 7/00* (2006.01)
*G06F 17/00* (2006.01)

(52) U.S. Cl. .................. 707/100; 707/200; 717/110
(58) Field of Classification Search ............... 717/100, 717/110, 112; 707/100, 6, 200, 104.1
See application file for complete search history.

(56) References Cited

U.S. PATENT DOCUMENTS 4,744,028 A    5/1988   Karmarkar .................. 364/402

(Continued)

FOREIGN PATENT DOCUMENTS

EP    1087306    *   8/2000

(Continued)

OTHER PUBLICATIONS

Maybury et al., "Expert Finding for Collaborative Virtual Environments", *Communications of the ACM*, vol. 44, No. 12, Dec. 2001, pp. 1, 2, 55, 56.

(Continued)

*Primary Examiner*—Sam Rimell
(74) *Attorney, Agent, or Firm*—Pillsbury Winthrop Shaw Pittman LLP (57) ABSTRACT

A system, method, and processor readable medium for processing data in a knowledge management system gathers information content and transmits a work request for the information content gathered. The information content may be registered with a content map and assigned a unique document identifier. A work queue processes the work requests. The processed information may then be transmitted to another work queue for further processing. Further processing may include categorization, full-text indexing, metrics extraction or other process. Control messages may be transmitted to one or more users providing a status of the work request. The information may be analyzed and further indexed. A progress statistics report may be generated for each of the processes performed on the document. The progress statistics may be provided in a record. A shared access to a central data structure representing the metrics history and taxonomy may be provided for all work queues via a CORBA service.

40 Claims, 5 Drawing Sheets

U.S. PATENT DOCUMENTS

| | | | |
|---|---|---|---|
| 5,740,549 A | 4/1998 | Reilly et al. .................. 705/14 |
| 5,761,512 A | 6/1998 | Breslau et al. .............. 395/705 |
| 5,895,470 A * | 4/1999 | Pirolli et al. ................ 707/100 |
| 6,041,311 A | 3/2000 | Chislenko et al. ............ 705/27 |
| 6,078,918 A * | 6/2000 | Allen et al. ..................... 707/6 |
| 6,115,709 A | 9/2000 | Gilmour et al. ................ 707/9 |
| 6,144,944 A | 11/2000 | Kurtzman, II et al. ........ 705/14 |
| 6,154,783 A | 11/2000 | Gilmour et al. ............ 709/245 |
| 6,205,472 B1 | 3/2001 | Gilmour ..................... 709/206 |
| 6,208,994 B1 | 3/2001 | Abdelnur .................... 707/103 |
| 6,240,466 B1 | 5/2001 | McKeehan et al. ......... 709/316 |
| 6,349,295 B1 | 2/2002 | Tedesco et al. ................ 707/3 |
| 6,353,840 B2 | 3/2002 | Saito et al. ................. 707/517 |
| 6,377,949 B1 | 4/2002 | Gilmour ...................... 707/10 |
| 6,377,983 B1 | 4/2002 | Cohen et al. ............... 709/217 |
| 6,397,203 B1 | 5/2002 | Hembry ........................ 707/2 |
| 6,405,197 B2 | 6/2002 | Gilmour ........................ 707/5 |
| 6,421,669 B1 | 7/2002 | Gilmour et al. ................ 707/9 |
| 6,513,039 B1 | 1/2003 | Kraenzel ....................... 707/9 |
| 6,516,350 B1 | 2/2003 | Lumelsky et al. .......... 709/226 |
| 6,553,365 B1 | 4/2003 | Summerlin et al. ............ 707/2 |
| 6,560,588 B1 | 5/2003 | Minter ........................ 706/50 |
| 6,604,110 B1 | 8/2003 | Savage et al. .............. 707/102 |
| 6,626,957 B1 | 9/2003 | Lippert et al. .............. 715/513 |
| 6,633,916 B2 | 10/2003 | Kauffman ................... 709/229 |
| 6,640,229 B1 | 10/2003 | Gilmour et al. ................ 707/9 |
| 6,647,384 B2 | 11/2003 | Gilmour ........................ 707/5 |
| 6,668,251 B1 | 12/2003 | Goldberg ....................... 707/5 |
| 6,687,873 B1 | 2/2004 | Ballantyne et al. ......... 715/500 |
| 6,697,800 B1 | 2/2004 | Jannink et al. ................ 707/5 |
| 6,711,570 B1 | 3/2004 | Goldberg et al. .............. 707/6 |
| 6,714,936 B1 | 3/2004 | Nevin, III ................... 707/102 |
| 6,732,331 B1 | 5/2004 | Alexander .................. 715/513 |
| 6,754,648 B1 | 6/2004 | Fittges et al. .................. 707/1 |
| 6,772,137 B1 | 8/2004 | Hurwood et al. .............. 707/2 |
| 6,789,054 B1 | 9/2004 | Makhlouf ...................... 703/6 |
| 6,801,940 B1 | 10/2004 | Moran et al. ............... 709/224 |
| 6,816,456 B1 | 11/2004 | Tse-Au .................... 370/230.1 |
| 6,832,224 B2 | 12/2004 | Gilmour ..................... 707/100 |
| 6,836,797 B2 | 12/2004 | Givoly et al. ............... 709/223 |
| 2002/0049621 A1 | 4/2002 | Bruce ........................... 705/7 |
| 2002/0049750 A1 | 4/2002 | Venkatram ..................... 707/3 |
| 2002/0078003 A1 | 6/2002 | Krysiak et al. ................. 707/1 |
| 2002/0087600 A1 | 7/2002 | Newbold .................... 707/514 |
| 2002/0111934 A1 | 8/2002 | Narayan ........................ 707/1 |
| 2002/0152244 A1 | 10/2002 | Dean et al. .................. 707/530 |
| 2003/0028525 A1 | 2/2003 | Santos et al. .................. 707/3 |
| 2003/0105732 A1 | 6/2003 | Kagalwala et al. ............ 707/1 |
| 2004/0068477 A1 | 4/2004 | Gilmour et al. ............... 707/1 |
| 2004/0111386 A1 | 6/2004 | Goldberg et al. .............. 707/1 |
| 2004/0205548 A1 | 10/2004 | Bax et al. ................... 715/513 |

FOREIGN PATENT DOCUMENTS

EP           1143356      * 10/2001

OTHER PUBLICATIONS

Mattox et al., "Enterprise Expert and Knowledge Discovery", *Proceedings of the International Conference on Human Computer Interaction Conference*, Aug. 23-27, 1999, Munich, Germany, 11 pages.

"Automated Expertise Profiling Saves Time", http://www.tacit.com/products/profiling.html, printed Jan. 9, 2002, 3 pages.

"KnowledgeMail", http://www.tacit.com/products/knowledgemail.html, printed Jan. 9, 2002, 3 pages.

"Expertise Discovery & Search", http://www.tacit.com/products/espdiscovery.html, printed Jan. 9, 2002, 2 pages.

Vivacqua, Adriana, et al., "Agents to Assist in Finding Help", *Conference on Human Factors & Computing Systems Proceedings*, in the Hague, the Netherlands, Apr. 2000, pp. 65-72.

Tacit, KnowledgeMail & KnowledgeMail Plus, "Creating the Smarter Enterprise" (Tacit Knowledge Systems, Inc., © May 2001). http://www.forbes.com/global/2001/0205/088_print.html, as it appears on Feb. 26, 2001.

McDonald, David W., "Evaluating Expertise Recommendations", *Proceedings of the 2001 International ACM SIGGROUP Conference on Supporting Group Work*, in Boulder, Colorado, Oct. 2, 2001, pp. 214-223.

http://www.tacit.com, as it appears on Dec. 7, 2000.

* cited by examiner

SYSTEM AND METHOD FOR PROCESSING DATA IN A DISTRIBUTED ARCHITECTURE

RELATED APPLICATIONS

This application claims priority from a U.S. Provisional Patent Application No. 60/347,283, filed Jan. 14, 2002, titled, "Knowledge Server," abandoned, which is hereby incorporated by reference. This application is related to co-pending patent application Ser. No. 10/044,913, filed Jan. 15, 2002, titled "System and Method for Using XML to normalize documents," pending, which is hereby incorporated by reference. This application is related to co-pending patent application Ser. No. 10/341,585, filed Jan. 14, 2003, titled "System for Categorizing and Normalizing Knowledge Data Based on User's Affinity to Knowledge," pending. This application is related to co-pending patent application No. 10/341,591, filed Jan. 14, 2003, titled "System and Method for Mapping Knowledge Data Based on User's Affinity to Knowledge" pending. This application is related to co-pending patent application Ser. No. 10/044,9 14, filed Jan. 15, 2002, titled "System and Method for Implementing a Metrics Engine for Tracking Relationships Over Time" pending. This application is related to co-pending patent application Ser. No. 10/341,583, filed Jan. 14, 2003, titled "System for Organizing Knowledge Data and Communicating with Users Having Affinity to Knowledge Data" pending.

FIELD OF THE INVENTION

The invention relates to a system and method for asynchronously processing data in a knowledge management system.

BACKGROUND OF THE INVENTION

Knowledge management systems are known. Knowledge management systems may be used to collect information from information systems within an organization. The knowledge management system may perform one or more processing actions on the information, such as, for example, categorization, full-text indexing, and metrics extraction. Each of these processes, however, are typically performed synchronously. Therefore, the information may only be available in each information system at varying times. A particular information system may be updated with other information and the information system may not be accessible for an extended period of time. This results in higher development costs and extended customer disruptions.

Current knowledge management systems typically use a single process for performing one or more processes on information collected from the information systems. Therefore, if an information system fails, information may be lost. This is a drawback.

These and other drawbacks exist.

SUMMARY OF THE INVENTION

An object of the invention is to overcome these and other drawbacks of existing systems.

Another object of the invention is to provide a system and method for processing data that performs one or more processes information in an asynchronous manner.

Another object of the invention is to provide a system and method for data processing that processes information in a parallel manner.

Another object of the invention is to provide a system and method for data processing that enables recovery of information in the event of a system failure.

Another object of the invention is to provide a system and method for normalizing documents using extensible markup language (XML).

Another object of the invention is to provide a system and method for normalizing documents using XML that enables meta data in a document to be preserved.

Another object of the invention is to provide a system and method for normalizing documents using XML that maps fields within the document with at least one field designation identifier.

Another object of the invention is to provide a system and method for normalizing documents using XML that provides full-text indexing, categorizing, and metrics extraction.

These and other objects of the invention are achieved according to various embodiments of the invention. According to one embodiment, a system, method, and processor readable medium comprising processor readable code embodied therein are provided that asynchronously process data in a knowledge management system. The system may gather information content from a repository according to a predetermined schedule. The information content may be registered with a content map. A unique document identifier may be assigned to the information content gathered. A work request regarding information content gathered may be transmitted to a persistent work queue. The persistent work queue may process the work request. The work request processing may include extracting a portion of the document in extensible markup language (XML) format so as to normalize at least a portion of the document contents. Control messages may be transmitted to one or more users providing a status of the work request.

The normalized document may then be transmitted to a processing work queue where additional data processing may occur. The additional data processing may include metrics extraction, full-text indexing, categorization, or other process. After processing is complete, the work queues may generate progress statistics reports that indicate a status of all work requests. The progress statistics reports may be transmitted to a scheduler component via a completion work queue. All system components may share access to a central data structure that represents a metrics history and taxonomy via a CORBA service.

These and other objects, features and advantages of the invention will be readily apparent to those having ordinary skill in the pertinent art from the detailed descriptions of the embodiments with reference to the appropriate figures below.

DETAILED DESCRIPTION OF PREFERRED EMBODIMENTS

A system, method, and processor readable medium for processing data in a knowledge management system is disclosed. The system may asynchronously process data such that multiple processes are performed simultaneously. The system may perform categorization, full-text indexing, and metrics extraction, or other process simultaneously, such that a repository is maintained with current information and in the event of a failure, the likelihood of recovering information is greater.

Figure 1:
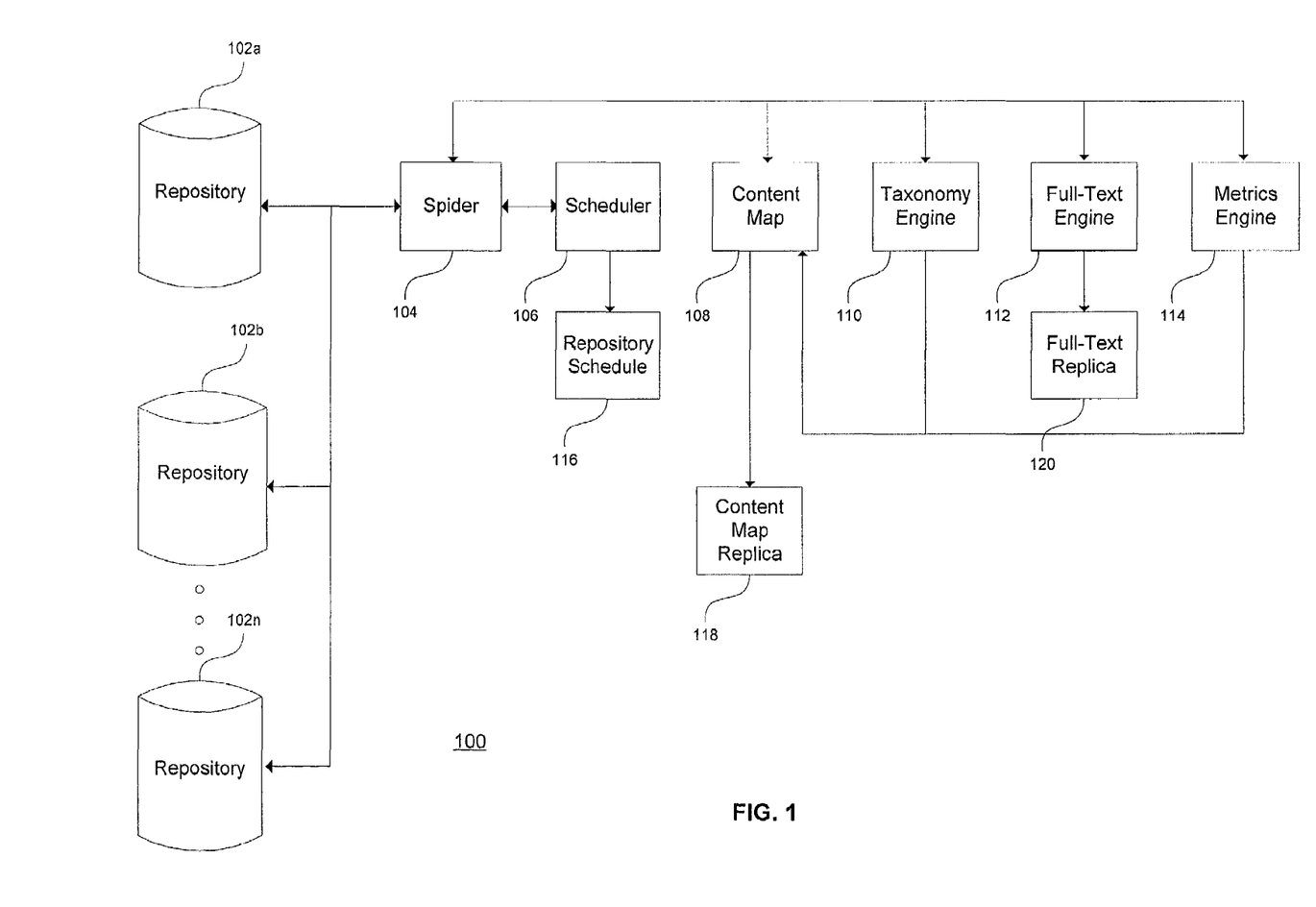
FIG. 1 is a schematic block diagram of a system for data processing according to one embodiment of the invention.

FIG. 1 illustrates a system 100 for asynchronously processing data according to one of the embodiment of the invention. System 100 may include repositories 102a–102n. Repositories 102a–102n may be in communication with spider component 104. A spider component may be, for example, a Domino add-in process that invokes threads to explore different repositories. Different spider types may be designed to extract content from various content repository types. Once a spider process is started, spider component 104 may start any number of additional threads to explore different repositories, including, for example, Lotus Notes™, Lotus QuickPlace™, Domino.Doc, electronic mail (Lotus Domino™), Web and file system. This enables one server to use a Lotus Notes™ spider and a second server to use a Lotus Notes™ and file system spider.

Spider component 104 may be in communication with a scheduler 106, content map component 108, taxonomy engine 110, full-text engine 112, and metrics engine 114. Spider component 104 may also communicate with content map 108, taxonomy engine 110, full-text engine 112, and metrics engine 114 to update and make available information stored in repositories 102a–102n in a variety of formats. Spider component 104 may receive work requests, on a scheduled basis, from scheduler 106 that describe which repositories to process on a work queue. The schedule may be hourly, daily, weekly, or other basis. The work requests may also be dispatched on a random basis. Scheduler 106 may communicate with a repository schedule 116 for determining when a particular process is scheduled. The repository schedule may detail a type and frequency of spidering for one or more repositories. For example, the repository schedule may identify that repository 102a is fill-text indexed on a daily basis and repository 102b has a categorization and metrics extraction performed hourly.

The processes may occur asynchronously. For example, content map 108 may process information in repositories 102a–102n such that a map of all content stored in repositories 102a–102n is provided. A replica of the content map may be stored as content replica 118. Taxonomy engine 110 may be used to determine categories of information stored in repositories 102a–102n. Full-text engine 112 may be used to provide a full-text index of information stored in repositories 102a–102n. Full-text engine 112 may communicate with full-text replica 120 that may be used as a backup for information provided by a full-text engine 112. Metric engine 114 may be used to extract metrics information from information stored in repositories 102a–102n. Taxonomy engine 110, full-text engine 112, and metrics engine 114 may be in communication with content map 108. Therefore, content map 108 may include a map of all information stored in repositories 102a–102n, categories of information stored in repositories 102a–102n, a full-text index of information stored in repositories 102a–102n, and metrics information for information stored in repositories 102a–102n.

Content map 108, taxonomy engine 110, full-text engine 112, and metric engine 114 preferably operate in an asynchronous manner. This enables each of content map 108, taxonomy engine 100, full-text engine 112, and metric engine 114 to operate independently. Content map 108, taxonomy engine 110, full-text engine 112, and metric engine 114 preferably do not rely on each other to perform a particular process. This enables information to be available to users because of a reduction in downtime. Additionally, each of content map 108, taxonomy engine 110, full-text engine 112, and metric engine 114 may be decoupled and replaced individually, thus reducing development costs.

A knowledge management system may be made more reliable by making the failure of a subsystem more recoverable. Scheduler 106 may include a protocol that handles a failure or shutdown of spider component 104. The protocol may be used to enable spider component to transmit a context on shutdown to scheduler 106. The context may then be transmitted back to spider component 104 when spider component 104 resumes functioning. This enables spider component 104 to resume processing work requests from an intermediate state. Any information regarding a failure or shutdown may be transmitted via a completion work queue. The work queues may include content map 108, taxonomy engine 110, full-text engine 112, and metrics engine 114. The system may also be more fault tolerant by separating various functions into various processes that may be run independently.

Figure 2:
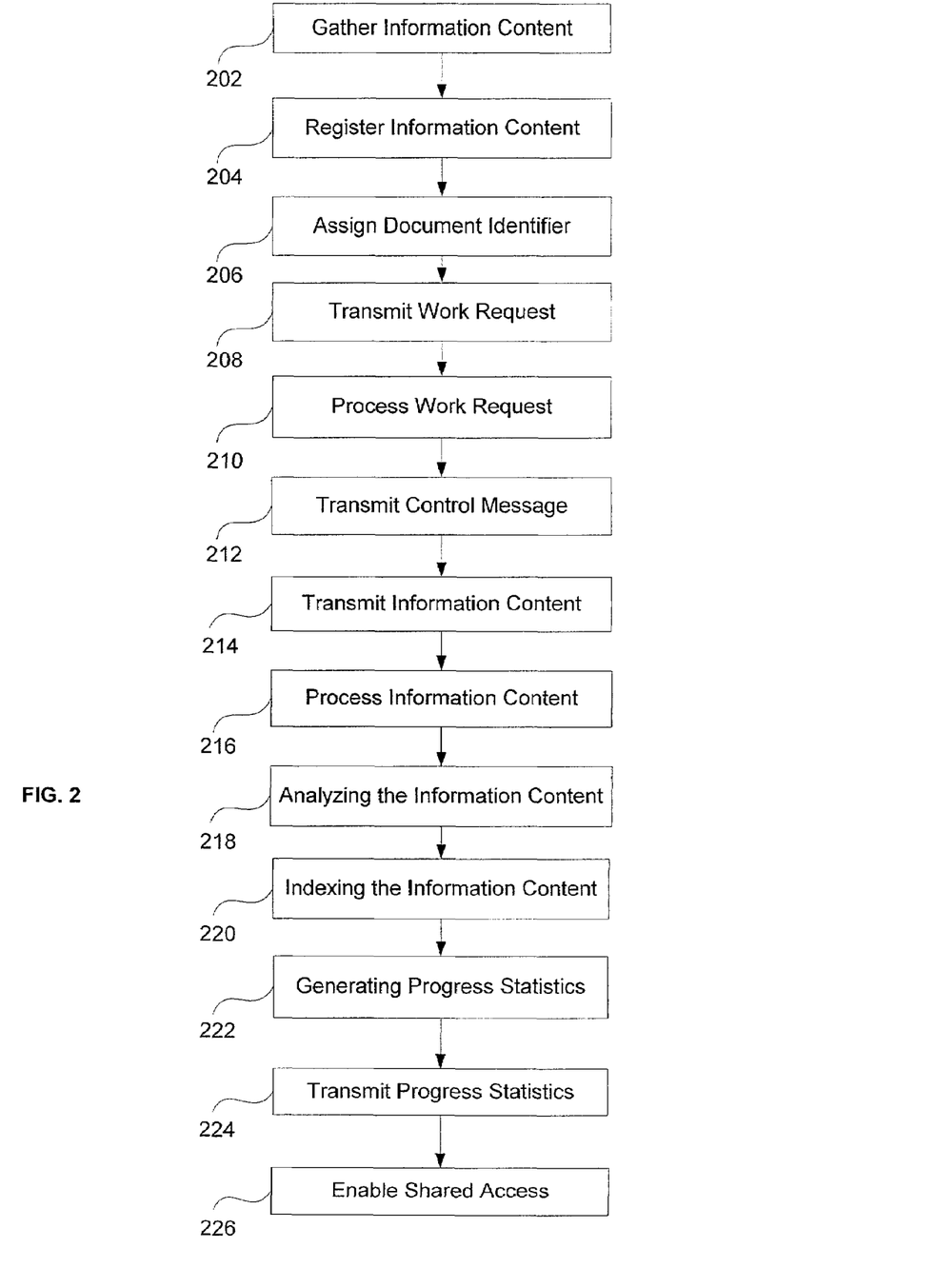
FIG. 2 is a schematic block diagram of the method for data processing according to one embodiment of the invention.

FIG. 2 illustrates a method for processing data in a knowledge management system according to one embodiment of the invention. Information content may be gathered for data processing by a spider component, step 202. The spider component may also register the information content gathered with a content map, step 204. The content map may assign the information content gathered a unique identifier, step 206. The spider component may transmit work requests to, for example, a taxonomy engine, full-text engine or metrics engine, regarding the information content gathered, step 208. The one or more engines may refer to the information content gathered using the unique identifier. The unique identifier may be a part of an extensible markup language (XML) meta-document representation (described in further detail below) that may be transmitted to system users.

The work requests may then be processed, step 210. The work request, may be, for example, processing the repository from which the information content is gathered and converting documents stored in the repository into a standard meta-document representation in XML format. The process of converting the document into a standard meta-document is described in further detail with reference to FIG. 4 below.

The spider component may transmit control messages to system users advising of a start and finish of a work request, step 212. The control messages preferably do not contain any XML content. The meta-document representations may then be transmitted to a designated module for predetermined processing, step 214. The modules may be, for example, a content map, taxonomy engine, full-text indexing engine, and a metrics engine. The modules may then process the meta-documents, step 216. The processing of the meta-documents may vary depending on the module performing the processing. For example, a content map may generate a map of the information content stored in a repository. A taxonomy engine may assign categories to the information content stored in a repository. A full-text indexing engine may generate a full-text index for information content stored in a repository. A metrics engine may extract metrics information from the information content stored in their repository and store only the metrics information. The processes may be performed asynchronously such that each module operates independently and may perform processes in a parallel manner. In this manner, a greater amount of information content in a repository is made available to users at least because the knowledge management system has less downtime for processing information content stored in a repository.

After the meta-documents are processed, the meta-documents may be analyzed, step 218. The analysis may be to determine a type of information content stored in a repository. The meta-documents may also be indexed, step 220.

Progress statistics may also be generated for each of the processes, step 222. The progress statistics may be presented in one or more reports and generated by a spider component and a work queue. The progress statistics may be transmitted to a scheduler component via a completion work queue, step 224. The scheduler component may read the progress statistics and update any corresponding statistics in a repository schedule. The scheduler component may also update a log database with any warnings or errors generated by a work queue. Each module may then be enabled with shared access to a central data structure representing the metrics history and taxonomy or other information via a CORBA service, step 226.

Figure 3:
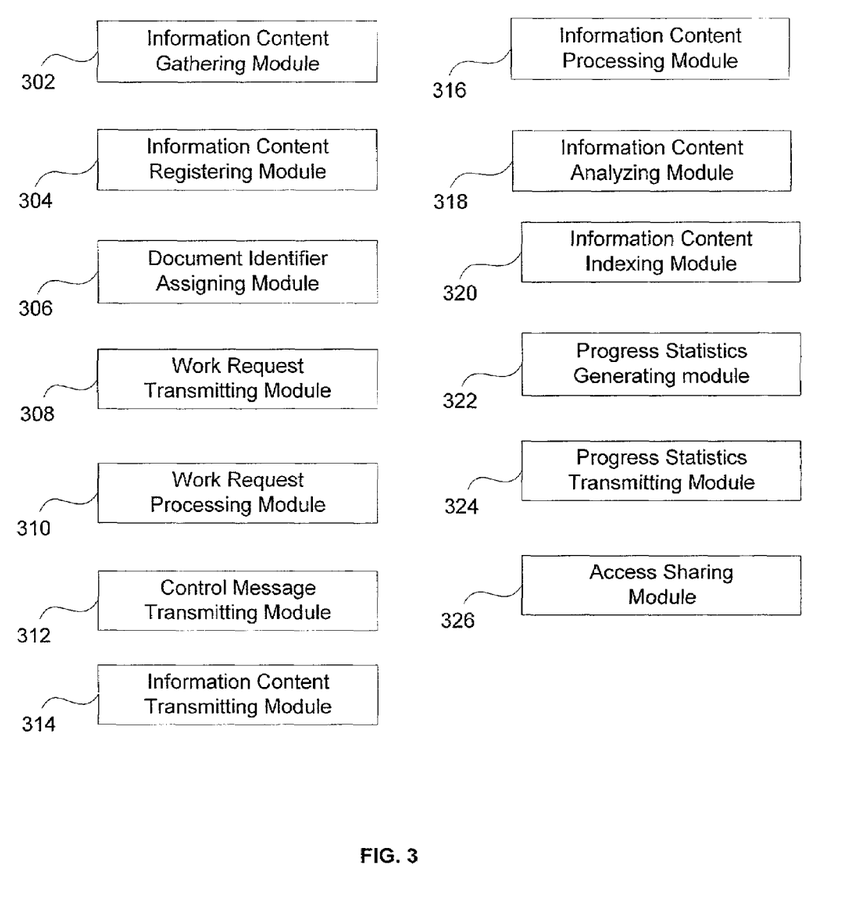
FIG. 3 is a schematic block diagram of data processing according to one embodiment of the invention.

FIG. 3 illustrates a system for processing data in a knowledge management system according to one embodiment of the invention. The system may include an information content gathering module 302, information content registering module 304, document identifier assigning module 306, work request transmitting module 308, work request processing module 310, control message transmitting module 312, information content transmitting module 314, information content processing module 316, information content analyzing module 318, information content indexing module 320, progress statistics generating module 322, progress statistics transmitting module 324, and access sharing module 326.

Information content gathering module 302 may be used to gather information content from one or more repositories based on a repository schedule. The repository schedule may identify a type and frequency with which to gather the information content. Information content registering module 304 may be used to register the information content gathered with, for example, a content map. Document identifier assigning module 306 may then assign the information content gathered one or more unique document identifiers that may be used by, for example, other modules for retrieving and identifying the information content. A work request regarding the information content gathered may be transmitted to a persistent work queue using work request transmitting module 308. The work requests may then be processed for the repository from which the information content was gathered using work request processing module 310. Work request processing module 310 may include converting documents stored in a repository into a standard meta-document representation in extensible markup language (XML) first. Control message transmitting module 312 may be used to transmit control messages to one or more users that provide a status regarding work requests. The control messages may identify a start and/or finish of a work request or other information.

The meta-documents may then be transmitted to a processing work queue for further processing using information content transmitting module 314. The processing may be, for example, full-text indexing, categorization, metrics extraction, or other process. The documents may be processed using information content processing module 316.

After processing the meta-documents, the meta-documents may be analyzed using information content analyzing module 318. The analysis may include determining a type of information stored in the repository. The meta-documents may also be indexed using information content indexing module 320.

Progress statistics regarding the processes performed on the information content gathered may be generated using progress statistics generating module 322. The progress statistics may be generated in one or more reports. The progress statistics may be transmitted to other components in a knowledge management system using progress statistics transmitting module 324. All components within the knowledge management system may be provided with shared access to a central data structure representing the metrics history and taxonomy of the information content via a CORBA service using access sharing module 326.

Figure 4:
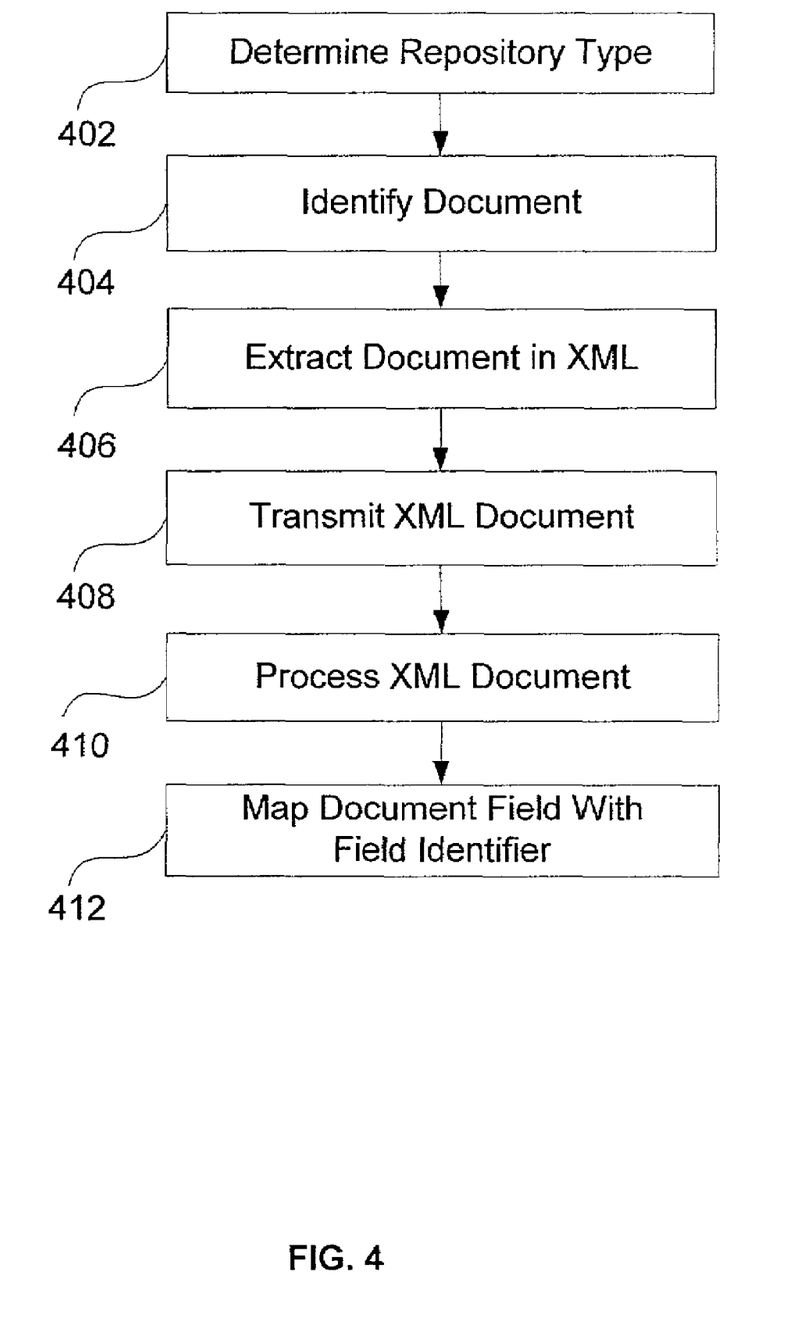
FIG. 4 is a schematic block diagram of a method for normalizing documents in XML format according to one embodiment of the invention.

FIG. 4 illustrates a method for processing a work request according to one embodiment of the invention. A work request may be processed by determining a repository type from which information content is gathered, step 402. The document may then be identified, step 404. The document may then be extracted from the repository in XML format, step 406. The document extracted may be a meta-document. The meta-document may include metrics information from the document. For example, the document may include author, title, subject, date created, date modified, list of modifiers, links list information, and other information. The meta-document may be transmitted to a work queue for further processing, step 408. The meta-document may then be processed according to a pre-determined process for the work queue, step 410. The work queue may, for example, categorize, full-text index, or perform other process on the meta-document. Fields within the meta-document may be mapped with a field identifier, step 412. For example, an author of a document may be mapped with an author field, a creation date may be mapped with a date created field, a title may be mapped with a title field, and other metrics information may be mapped with a corresponding field designation identifier.

Figure 5:
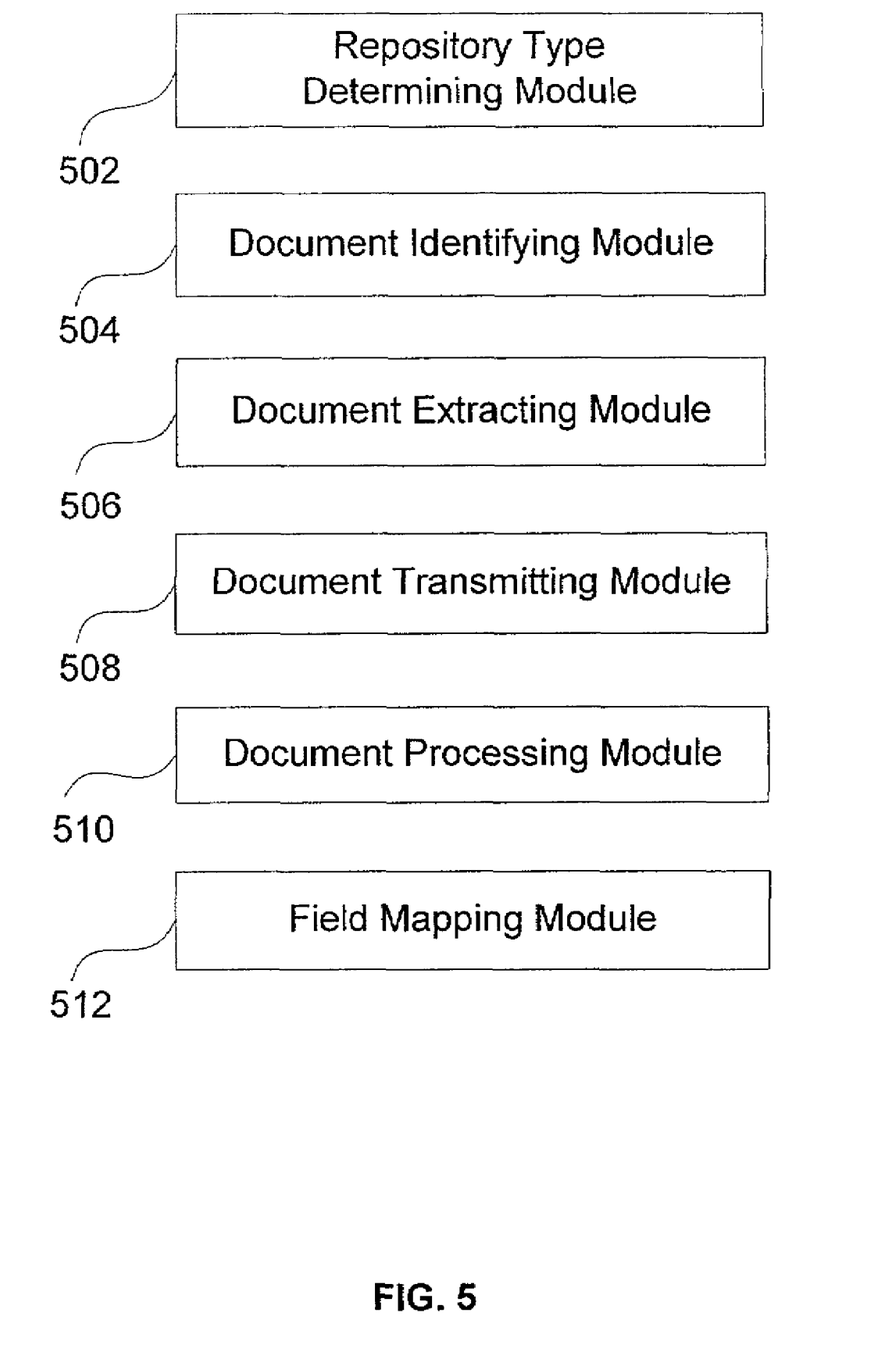
FIG. 5 is a schematic block diagram of a system for normalizing documents using XML according to one embodiment of the invention.

FIG. 5 illustrates a system for processing a work request according to one embodiment of the invention. The system may include repository type determining module 502, document identifying module 504, document extracting module 506, document transmitting module 508, document processing module 510, and field mapping module 512.

Repository type determining module 502 may determine a repository type from which a document may be gathered. Document identifying module 504 may identify the document to be collected from the repository. Document extracting module 506 may extract the document from the repository. Document extracting module 506, however, may convert the document stored in the repository into a standard meta-document representation in an XML format. The meta-document may include meta-data regarding the document. For example, the meta-document may include author, title, subject, date created, date modified, list of modifiers, and links list information.

The meta-document may then be transmitted to a work queue for processing using document transmitting module 508. The meta-document may then be processed according to a process designated for a particular work queue using document processing module 510. The processes may include, for example, categorization, full-text indexing, metrics extraction or other process. Field mapping module 512 may be used to map fields in the meta-document with a field designation identifier. For example, author, title, and subject information may be mapped with an author field, title field, and subject field, respectively. Other fields may also be mapped.

Other embodiments and uses of the invention will be apparent to those skilled in the art in consideration of the specification and practice of the invention is disclosed herein. The specification and examples should be considered exemplary only. For example, although the invention has been described in terms of a document, a document may be any or current document that may be categorized; for example, electronic mail messages, graphic files, or other type of electronic document. Additionally, although the invention has been described in terms of multiple modules, fewer or a greater number of modules may be used and modules may not be provided in the same location. The scope of the invention is only limited by the claims appended hereto.

What is claimed is:

1. A method for processing data in a distributed architecture, the method comprising the steps of:
   receiving a work request that identifies at least one repository for processing, wherein the at least one identified repository is included in a plurality of repositories;
   determining a repository type of the at least one repository;
   determining a spider type for gathering information content from the at least one identified repository, wherein the spider type is determined based on the repository type;
   gathering information content from the at least one repository identified in the work request;
   registering the information content;
   assigning the information content to at least one document identifier;
   transmitting the work request regarding the information content to a first work queue;
   processing the work request by generating a meta-document representation of at least a portion of the information content;
   transmitting the meta-document representation to a second work queue; and
   analyzing the meta-document representation.

2. The method of claim 1, wherein the meta-document representation comprises extensible markup language (XML) format.

3. The method of claim 1, wherein the step of analyzing the meta-document representation comprises metrics extraction of the meta-document representation.

4. The method of claim 1, wherein the step of analyzing the meta-document representation comprises:
   indexing the meta-document representation.

5. The method of claim 1, further comprising the step of:
   generating progress statistics regarding the step of analyzing the meta-document representation.

6. The method of claim 5, further comprising the step of:
   transmitting the progress statistics to a third work queue.

7. The method of claim 1, wherein the first work queue and the second work queue share access to a central data structure.

8. The method of claim 7, wherein access is shared via a CORBA service.

9. The method of claim 7, wherein the central data structure represents at least one of a metrics history and taxonomy regarding the information content.

10. A system for processing data in a distributed architecture, the system comprising:
    a scheduling module that identifies at least one repository for processing, determines a repository type of the at least one repository, determines a spider type for gathering information content from the at least one identified repository, and generates a work request that identifies the at least one repository for processing,
    wherein the spider type is determined based on the repository type, and the repository is included in a plurality of repositories;
    an information content gathering module that gathers information content from the repository identified in the work request;
    a registering module that registers the information content;
    an assigning module that assigns the information content at least one document identifier;
    a work request transmitting module that transmits the work request regarding the information content to a first work queue;
    a work request processing module that processes the work request by generating a meta-document representation of at least a portion of the information content;
    an information content transmitting module that transmits the meta-document representation to a second work queue; and
    an information content processing module that analyzes the meta-document representation.

11. The method of claim 1 wherein the step of analyzing the meta-document representation comprises categorizing the meta-document representation.

12. The system of claim 10, wherein the meta-document representation comprises extensible markup language (XML) format.

13. The system of claim 10, wherein the information content processing module that analyzes the meta-document representation comprises:
    a metrics extraction module that performs metrics extraction on the meta-document representation.

14. The system of claim 10, wherein the information content processing module that analyzes the meta-document representation comprises:
    an indexing module that indexes the meta-document representation.

15. The system of claim 10, further comprising:
    a generating module that generates progress statistics regarding the analyzing of the meta-document representation.

16. The system of claim 15, further comprising:
    a progress statistics transmitting module that transmits the progress statistics to a third work queue.

17. The system of claim 10, wherein the first work queue and the second work queue share access to a central data structure.

18. The system of claim 17, wherein access is shared via a CORBA service.

19. The system of claim 17, wherein the central data structure represents at least one of a metrics history and taxonomy regarding the information content.

20. The system of claim 10, wherein the information content processing module that analyzes the meta-document representation comprises a categorizing module that categorizes the meta-document representation.

21. A system for processing data in a distributed architecture, the system comprising:
- scheduling means for identifying at least one repository for processing, determining a repository type of the at least one repository, determining a spider type for gathering information content from the at least one identified repository, and generating a work request that identifies the at least one repository for processing, wherein the spider type is determined based on the repository type, and the repository is included in a plurality of repositories;
- gathering means for gathering information content from the repository identified in with the work request;
- registering means for registering the information content;
- assigning means for assigning the information content at least one document identifier;
- work request transmitting means for transmitting the work request regarding the information content to a first work queue;
- work request processing means for processing the work request by generating a meta-document representation of at least a portion of the information content;
- information content transmitting means for transmitting the meta-document representation to a second work queue; and
- information content processing means for analyzing the meta-document representation.

22. The system of claim 21, wherein the meta-document representation comprises extensible markup language (XML) format.

23. The system of claim 21, wherein the information content processing means for analyzing the meta-document representation comprises:
- metrics extraction means for performing metrics extraction on the meta-document representation.

24. The system of claim 21, wherein the information content processing means for analyzing the meta-document representation comprises:
- indexing means for indexing the meta-document representation.

25. The system of claim 21, further comprising:
- progress statistics generating means for generating progress statistics regarding the analyzing of the meta-document representation.

26. The system of claim 25, further comprising:
- progress statistics transmitting means for transmitting the progress statistics to a third work queue.

27. The system of claim 21, wherein the first work queue and the second work queue share access to a central data structure.

28. The system of claim 27, wherein access is shared via a CORBA service.

29. The system of claim 27, wherein the central data structure represents at least one of a metrics history and taxonomy regarding the information content.

30. The system of claim 21, wherein the information content processing means for analyzing the meta-document representation comprises categorization means for categorizing the meta-document representation.

31. A processor readable medium comprising processor readable code embodied therein for causing a processor to process data in a distributed architecture, the medium comprising:
- work request receiving code that causes a processor to receive a work request that identifies at least one repository for processing, wherein the at least one identified repository is included in a plurality of repositories;
- repository type determining code that causes a processor to determine a repository type of the at least one repository;
- spider type determining code that causes a processor to determine a spider type for gathering information content from the at least one identified repository, wherein the spider type is determined based on the repository type;
- information content gathering code that causes a processor to gather information content from the repository identified in the work request;
- registering code that causes a processor to register the information content;
- assigning code that causes a processor to assign the information content at least one document identifier;
- work request transmitting code that causes a processor to transmit the work request regarding the information content to a first work queue;
- work request processing code that causes a processor to process the work request by generating a meta-document representation of at least a portion of the information content;
- information content transmitting code that causes a processor to transmit the meta-document representation to a second work queue; and
- information content processing code that causes a processor to analyze the meta-document representation.

32. The medium of claim 31, wherein the meta-document representation comprises extensible markup language (XML) format.

33. The medium of claim 31, wherein the information content processing code that causes a processor to analyze the meta-document representation comprises:
- categorizing code that causes a processor to categorize the meta-document representation.

34. The medium of claim 31, wherein the information content processing code that causes a processor to analyze the meta-document representation comprises:
- indexing code that causes a processor to index the meta-document representation.

35. The medium of claim 31, further comprising:
- generating code that causes a processor to generate progress statistics regarding the analyzing of the meta-document representation.

36. The medium of claim 35, further comprising:
- progress statistics transmitting code that causes a processor to transmit the progress statistics to a third work queue.

37. The medium of claim 31, wherein the first work queue and the second work queue share access to a central data structure.

38. The medium of claim 37, wherein access is shared via a CORBA service.

39. The medium of claim 37, wherein the central data structure represents at least one of a metrics history and taxonomy regarding the information content.

40. The medium of claim 31, wherein the information content processing code that causes a processor to analyze the meta-document representation comprises categorization code that categorizes the meta-document representation.

* * * * *